US009225823B2

(12) United States Patent  
Andreasson et al.

(10) Patent No.: US 9,225,823 B2  
(45) Date of Patent: Dec. 29, 2015

(54) PORTABLE ELECTRONIC DEVICES AND METHODS FOR DOWNLOADING APPLICATIONS BASED ON PRESENCE OF THE PORTABLE ELECTRONIC DEVICE IN A DEFINED GEOGRAPHICAL REGION

(75) Inventors: Markus Andreasson, Lund (SE); Erik Backlund, Gantofta (SE)

(73) Assignees: Sony Corporation, Lund (SE); Sony Mobile Communications AB, Lund (SE)

( * ) Notice: Subject to any disclaimer, the term of this patent is extended or adjusted under 35 U.S.C. 154(b) by 1541 days.

(21) Appl. No.: 11/848,453

(22) Filed: Aug. 31, 2007

(65) Prior Publication Data

US 2009/0061890 A1    Mar. 5, 2009

(51) Int. Cl.
  *G06F 15/16* (2006.01)
  *H04M 1/725* (2006.01)
  *H04W 4/00* (2009.01)
  *H04W 4/02* (2009.01)
  *H04L 29/08* (2006.01)

(52) U.S. Cl.
  CPC ........... *H04M 1/72572* (2013.01); *H04L 67/18* (2013.01); *H04L 67/34* (2013.01); *H04M 1/72525* (2013.01); *H04W 4/001* (2013.01); *H04W 4/02* (2013.01); *H04W 4/021* (2013.01); *H04W 4/023* (2013.01); *H04M 1/72561* (2013.01); *H04M 1/72566* (2013.01); *H04M 2250/10* (2013.01)

(58) Field of Classification Search
  CPC .......... H04L 67/04; H04L 67/18; H04L 67/34
  USPC .................. 455/456.1, 456.3, 414.1, 519
  See application file for complete search history.

(56) References Cited

U.S. PATENT DOCUMENTS

| 7,072,672 | B1 * | 7/2006 | Vanska et al. ............... 455/456.3 |
| 2002/0164998 | A1 * | 11/2002 | Younis .......................... 455/456 |
| 2004/0203909 | A1 | 10/2004 | Koster |
| 2005/0032528 | A1 * | 2/2005 | Dowling et al. ........... 455/456.1 |
| 2005/0113123 | A1 * | 5/2005 | Torvinen ...................... 455/519 |
| 2005/0191991 | A1 * | 9/2005 | Owen et al. .................. 455/411 |
| 2006/0080032 | A1 * | 4/2006 | Cooper et al. ............... 701/208 |
| 2006/0138224 | A1 * | 6/2006 | Azami et al. ................ 235/385 |
| 2008/0070593 | A1 | 3/2008 | Altman et al. |

FOREIGN PATENT DOCUMENTS

| EP | 1130495 A2 | 9/2001 |
| EP | 1758411 A1 | 2/2007 |
| WO | WO 2004/040923 A1 | 5/2004 |

OTHER PUBLICATIONS

International Search Report, PCT/EP2008/050789, May 29, 2008.

* cited by examiner

*Primary Examiner* — Qun Shen
(74) *Attorney, Agent, or Firm* — Myers Bigel Sibley & Sajovec

(57) ABSTRACT

Methods, portable electronic devices and servers are provided for downloading applications to the portable electronic device from the server based on a geographical location of the portable electronic device. One or more applications are stored at the server. The one or more applications have an associated region and duration. A current position of the portable electronic device is determined. Ones of the stored applications are downloaded from the server to the portable electronic device if the current position of the portable electronic device is within the associated region.

17 Claims, 4 Drawing Sheets

PORTABLE ELECTRONIC DEVICES AND METHODS FOR DOWNLOADING APPLICATIONS BASED ON PRESENCE OF THE PORTABLE ELECTRONIC DEVICE IN A DEFINED GEOGRAPHICAL REGION

FIELD OF THE INVENTION

The present invention relates to portable electronic devices, and, more particularly, to controlling portable electronic devices including location circuits and associated methods.

BACKGROUND OF THE INVENTION

Portable electronic devices, such as mobile terminals, are typically configured with the ability to communicate with a communications network, such as the Internet. Furthermore, many conventional portable electronic devices are also equipped with positioning systems. Thus, conventional portable electronic devices within a specific location may receive messages broadcast over the communications network. For example, a movie theater may broadcast the movies currently playing at the theater so that users passing by the movie theater can view the movie list on their portable electronic devices.

SUMMARY OF THE INVENTION

Some embodiments of the present invention provide portable electronic devices configured to communicate with and download applications from a server configured to store at least one application based on a geographical location of the portable electronic device. The application has an associated region and duration. The portable electronic device includes a location circuit and a data manager. The location circuit is configured to determine a current position of the portable electronic device and provide the current position of the portable electronic device to the server. The data manager is configured to receive a link to the at least one application from the server responsive to the provided current position information and download the at least one stored application using the received link if the current position of the portable electronic device is within the associated region.

In further embodiments of the present invention, the portable electronic device may be associated with a unique device identifier. The location circuit may be further configured to periodically determine a current position of the portable electronic device and transmit the current position of the portable electronic device and the unique device identifier to the server.

In still further embodiments of the present invention, the data manager may be further configured to transmit the current position of the portable electronic device and the unique device identifier to the server and receive the link to the at least one application and the associated duration of the at least one application from the server if it is determined that the unique device identifier of the portable electronic device is associated with the at least one application.

In some embodiments of the present invention, the data manager may be further configured to determine if the portable electronic device is in the associated region during the associated duration and run the at least one downloaded application if it is determined that the portable electronic device is in the associated region during the associated duration.

In further embodiments of the present invention, the at least one application may be a web page. The portable electronic device may further include a content handler configured to open a web browser on the portable electronic device and load the web page on the web browser. In certain embodiments of the present invention, the data manager may be further configured to automatically create a bookmark for the web page.

In still further embodiments of the present invention, the at least one application may be an executable application. The portable electronic device may further include a content handler configured to install the executable application and execute the executable application on the portable electronic device.

In some embodiments of the present invention, the data manager may be further configured to automatically uninstall the at least one application if it is determined that the portable electronic device has exited the associated region.

In further embodiments of the present invention, the portable electronic device may further include an application circuit configured to schedule an uninstall event for the at least one application based on the associated duration of the at least one application provided by the server. The application circuit may be further configured to determine if the associated duration of the at least one application has elapsed based on the uninstall schedule. The data manager may be further configured to automatically uninstall the at least one application if it is determined that the duration of the at least one application has elapsed.

In still further embodiments of the present invention, the location circuit may be further configured to automatically determine the current position of the portable electronic device responsive to the automatic uninstall and provide the current position to the server so as to allow the portable electronic device to determine if at least one additional application is available to be downloaded to the portable electronic device based on the current position of the portable electronic device and the current date.

Some embodiments of the present invention provide a server configured to download applications to a portable electronic device based on a geographical location of the portable electronic device. The server includes a storage device and a communications circuit. The storage device is configured to store at least one application having an associated region and duration. The communications circuit is configured to receive current position information associated with the portable electronic device from the portable electronic device and download a link to at least one of the at least one stored applications to the portable electronic device if the current position of the portable electronic device is within the associated region.

In further embodiments of the present invention, the communications circuit may be further configured to receive the current position of the portable electronic device and a unique device identifier from the portable electronic device; determine if the unique device identifier of the portable electronic device is associated with the at least one application; and download the link to the at least one application and the associated duration of the at least one application to the portable electronic device if it is determined that the unique device identifier of the portable electronic device is associated with the at least one application.

In still further embodiments of the present invention, the at least one application may have an associated unique application identifier. The communications circuit may be further configured to receive updates for the at least one application during the associated duration of the at least one application, the updates being associated with the unique application identifier; and announce the received updates to users of the at least one application having the unique application identifier.

In some embodiments of the present invention, the communications circuit may be further configured to receive, from an owner of the at least one application:

region data defining the associated region for the at least one application;

duration data defining the associated duration for the at least one application;

a link to the at least one application or the at least one application; and at least one client identifier that identifies users allowed to access the at least one application.

Further embodiments of the present invention provide methods for downloading applications to a portable electronic device from a server based on a geographical location of the portable electronic device. The at least one application is stored at the server and has an associated region and duration. A current position of the portable electronic device is determined. At least one of the at least one stored applications is downloaded from the server to the portable electronic device if the current position of the portable electronic device is within the associated region.

In still further embodiments of the present invention, the portable electronic device is associated with a unique device identifier. A current position of the portable electronic device may be periodically determined at the portable electronic device. The current position of the portable electronic device and the unique device identifier may be transmitted from the portable electronic device to the server. A link to the at least one application and the associated duration of the at least one application may be downloaded from the server if it is determined that the unique device identifier of the portable electronic device is associated with the at least one application.

In some embodiments of the present invention, it may be determined if the portable electronic device is in the associated region during the associated duration. The at least one application may be downloaded using the link if it is determined that the portable electronic device is in the associated region during the associated duration. The at least one application may be automatically uninstalled if it is determined that the portable electronic device has exited the associated region.

In further embodiments of the present invention, an uninstall event may be scheduled for the at least one application based on the associated duration of the at least one application provided by the server.

In still further embodiments of the present invention, it may be determined if the associated duration of the at least one application has elapsed based on the uninstall schedule. The at least one application may be automatically uninstalled if it is determined that the duration of the at least one application has elapsed. The position of the portable electronic device may be automatically determined responsive to the automatic uninstall. The current position of the portable electronic device may be provided to the server so as to allow the portable electronic device to determine if at least one additional application is available to be downloaded to the portable electronic device based on the current position of the portable electronic device and the current date.

DETAILED DESCRIPTION OF EMBODIMENTS OF THE INVENTION

Figure 1:
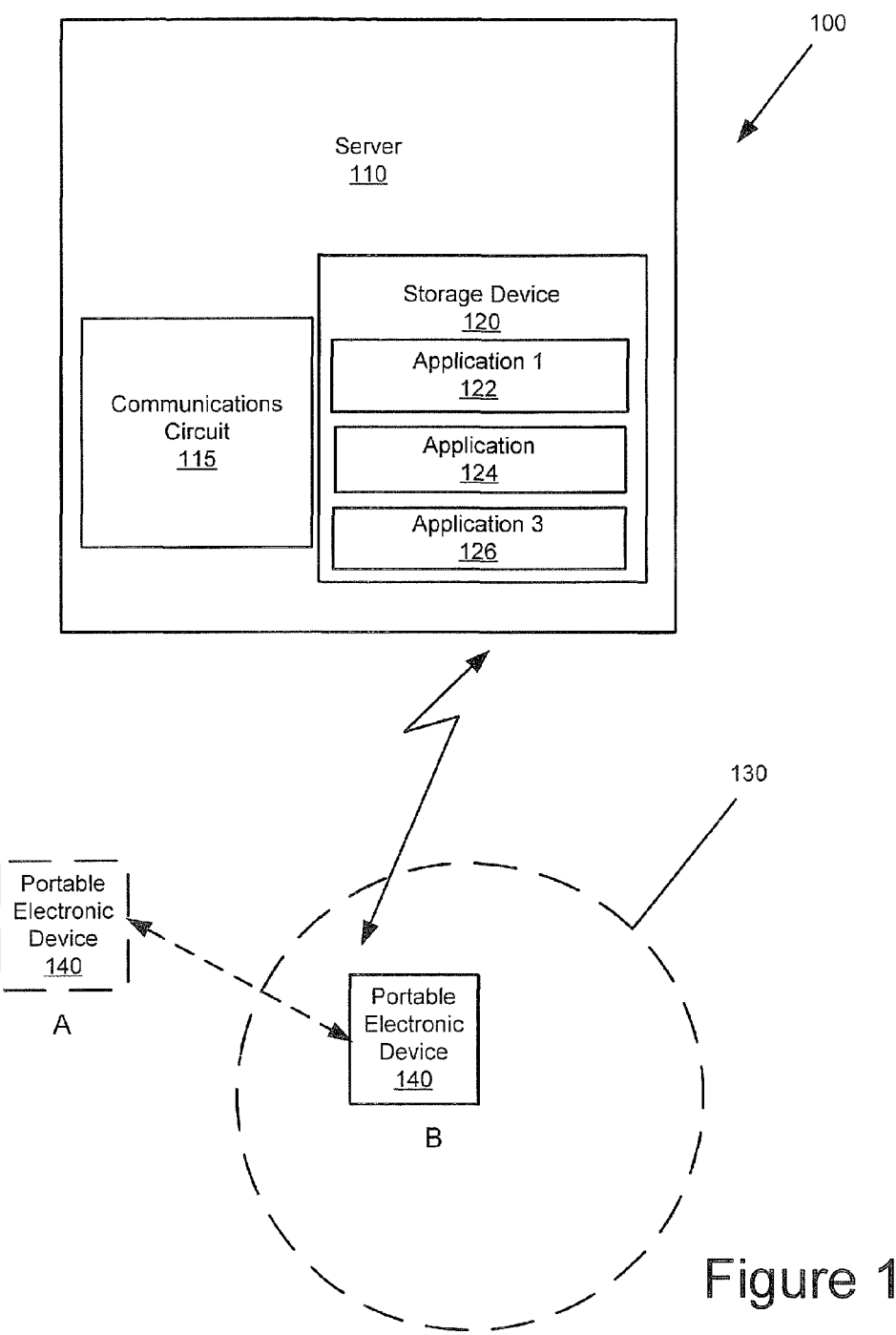
FIG. 1 is a schematic block diagram illustrating a system including a server and portable electronic device according to some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

For purposes of illustration and explanation only, various embodiments of the present invention are described herein in the context of portable electronic devices. It will be understood, however, that the present invention is not limited to such embodiments and may be embodied generally in any portable electronic device that includes a positional circuit that operates in accordance with at least one embodiment described herein.

As will be discussed further below with respect to FIGS. 1 through 4, some embodiments of the present invention provide methods, servers and portable electronic devices for downloading applications from the server to the portable electronic device. The server is configured to store one or more applications, each having an associated region and duration. Portable electronic devices according to some embodiments of the present invention may be associated with a unique device identifier. The portable electronic device may be configured to periodically obtain a current position of the portable electronic device and provide the current position and the unique device identifier to the server. If the portable electronic device is within a region associated with one of the stored applications, the server may determine if the unique identifier associated with the portable electronic device is also associated with the stored application for that region. If so, the server may download a link to the stored application to the portable electronic device so as to allow the portable electronic device to access the application while the portable electronic device is within the region and during the defined duration of the application as will be discussed further herein.

Referring now to FIG. 1, a system 100 including a server 110 and a portable electronic device 140 for downloading applications based on a current position (geographical region) of a portable electronic device in accordance with some embodiments of the present invention will be discussed. Although embodiments of the present invention illustrated in FIG. 1 include a single server 110 and a single portable electronic device 140, embodiments of the present invention are not limited to this configuration. Two or more servers and/or portable electronic devices may be provided without departing from the scope of the present invention.

As further illustrated in FIG. 1, the server includes a communications circuit 115 and a storage device 120. The communications circuit 115 is configured to communicate with one or more portable electronic devices 140 in accordance with some embodiments of the present invention. One or more applications 122, 124 and 126 are stored in a storage device 120 on the server 110. As used herein, "application" may refer to an application or a web page without departing from the scope of the present invention. Although only three applications 122, 124 and 126 are provided in FIG. 1, embodiments of the present invention are not limited to this configuration. For example, less or more than three applications may be stored at the server 110 without departing from the scope of the present application. Each of the applications may be associated with a certain geographic region and have a defined duration. As used herein, "geographic region" may be any region defined by the owner of the application. For example, if the application were associated with a baseball game, the region may be defined around the perimeter of the baseball stadium. Furthermore, as used herein the "duration" of the application defines a time period during which the application will be available to user's of portable electronic devices within the defined geographic region. For example, the duration may include a date and a time period, such as May 15, 2008 from 1:00 P.M. to 5:00 P.M.

An owner, for example, a travel agency, trade fair organizer and the like, of an application 122, 124 and 126 may store/register the application 122, 124 and 126 by connecting to the server 110 and providing region data, duration data, a link to the application and a list of portable electronic devices that may access the application. The region data may define the geographical region 130 where the application is valid and allowed to run. The duration data defines a time period during which the application is valid and allowed to run. The application provided by the link may be, for example, a Java Midlet, a uniform resource locator (URL) to a Java Midlet or a URL to a web page. The list of portable electronic devices 140 that may access the application may be provided by a set of device identifiers associated with the portable electronic devices. In some embodiments of the present invention, this set may include all possible clients, i.e. the set may be undefined. However, in some embodiments of the present invention, the application may only be available to subscribers. Once the duration of the application has elapsed, the server 110 may be configured to automatically remove the application and any information related thereto from the server 110.

As further illustrated in FIG. 1, the system 100 also includes a portable electronic device 140 associated with a user. As used herein, the term "portable electronic device" includes: a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver. Any portable electronic device capable of operating in accordance with some embodiments of the present invention may be used without departing from the scope of the present invention.

Portable electronic devices 140 according to some embodiments of the present invention are configured to determine a current position thereof using any positioning device known to those having skill in the art, for example, a GPS receiver. Portable electronic devices 140 according to some embodiments of the present invention are also configured to download applications 122, 124 and 126 from the server based on the determined current position of the portable electronic device, for example, the presence of the portable electronic device 140 within a defined region, for example, region 130. As illustrated in FIG. 1, the portable electronic device 140 may move from a first position A, outside the region 130, to a second position B, inside the region 130. Movement from outside the region 130 to inside the region 130 may trigger downloading of one or more applications 122, 124 and 126 associated with the region 130 from the server 110 to the portable electronic device 140 as will be discussed further below. The portable electronic device 140 is configured to install and execute the downloaded applications 122, 124 and 126. In some embodiments, this installation and downloading may be performed automatically. The portable electronic device may also be configured to remove/uninstall the installed applications when it is determined that the portable electronic device has exited the region 130. This may also be performed automatically. Portable electronic devices and related operations thereof will be discussed further below with respect to FIGS. 2 through 4.

Embodiments of the present invention may be used in many environments without departing from the scope of the present invention. Exemplary uses of embodiments of the present invention will be discussed below with respect to FIG. 1, however, it will be understood that embodiments of the present invention are not limited by these examples.

The system 100 may be used in combination with a trade fair. For example, when the portable electronic device 140 enters the region 130 of the trade fair at the time the fair is open (during the duration of the application associated with the trade fair), the associated application 122, 124 and 126 may be downloaded from the server 110 to the portable electronic device 140. In some embodiments of the present invention, the application 122, 124 and 126 may be automatically installed and executed. In this embodiment, the application may include offers from companies, maps for the area, agenda for speeches and happenings and a chat channel open for all who are attending the fair and have the application running on their portable electronic device 140. The chat channel can be accessed by, for example, visitors asking other visitors about interesting companies and products.

In some embodiments of the present invention, the system 100 may be used in combination with tourist information. For example, when the portable electronic device 140 enters a city defined by region 130 or other tourist area, an application associated with the region/city 130 may be downloaded to the portable electronic device 140, installed and executed. This may happen automatically in some embodiments. The application may include, for example, maps of the area, tourist guides for specific sightings and a chat channel open for all tourists who are in the area and have the application running on their portable electronic device 140. The chat channel may be accessed, for example, by backpackers who wish to meet other backpackers during the visit to the region 130.

In some embodiments of the present invention, the system 100 may be used in combination with sporting events. For example, when the portable electronic device 140 enters an arena defined by region 130 at the time of a sporting event, an application associated with the sporting event may be downloaded to the portable electronic device 140, installed and executed. This may happen automatically. The application associated with the sporting event may contain a result board, advertisements, a function that allows a user to watch replays of certain events, a function that allows pictures taken by the visitors to be uploaded to an album and browsing of the album and a chat channel open for all who are attending the sporting event and have the application running on their portable electronic device 140. The chat channel can be used by, for example, spectators who wish to comment on certain events during the sporting event.

In some embodiments of the present invention, the system 100 may be used for advertising purposes. For example, when the portable electronic device 140 enters a shopping district or supermarket defined by region 130 during open hours, an application associated with the shopping district may be downloaded, installed and executed. This may happen automatically in some embodiments. The application associated with the shopping district may include, for example, offers from or advertisements associated with the different shops in the area.

In some embodiments of the present invention, the system 100 may be used for operator services during roaming. For example, when the portable electronic device 140 enters an area defined by region 130 where the operator is not present and roaming is used, an application associated with the region 130 may be downloaded, installed and executed. This may happen automatically is some embodiments. The application associated with the region 130 may include, for example, means for automatically selecting the best, such as the cheapest, operator to use. This information may be downloaded from a server owned by the home operator. The application associated with the region 130 may also offer alternative communication services, such as voice over Internet protocol (VoIP) or instant messaging, that may be cheaper or offer more features than the standard services provided by the hosted operator.

Figure 2:
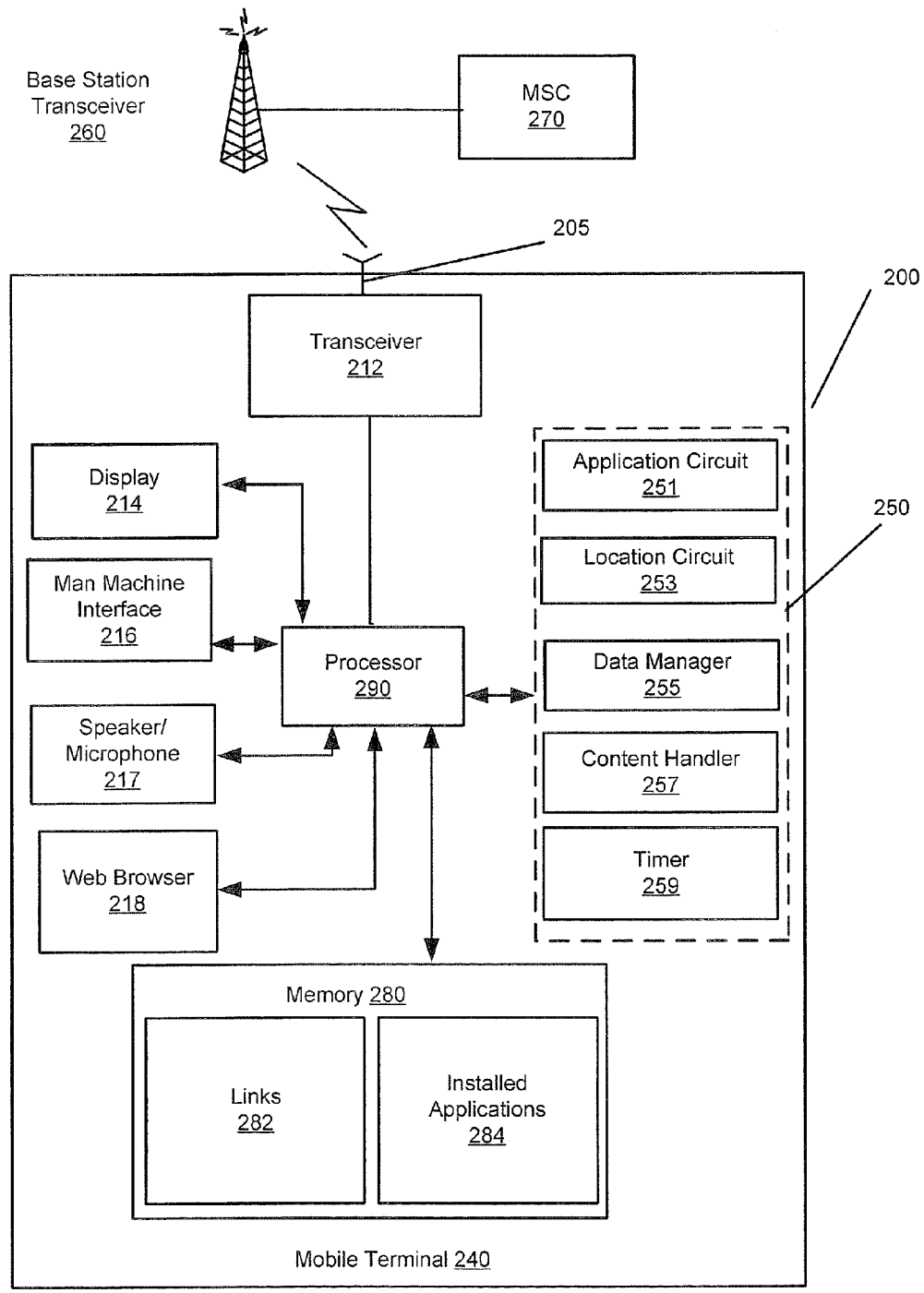
FIG. 2 is a schematic block diagram illustrating a portable electronic device and a cellular communication system in accordance with some embodiments of the present invention.

Referring now to FIG. 2, a schematic block diagram illustrating a portable electronic device 240 according to some embodiments of the present invention will be discussed. As further illustrated in FIG. 2, the portable electronic device 240 includes a portable housing 200 and may include a display 214, a man machine interface (MMI) 216, a speaker/microphone 217, a web browser 218, a transceiver 212 and a memory 280, any of which may communicate with a processor 290. Furthermore, portable electronic devices 240 according to embodiments of the present invention may further include a download control circuit 250 according to some embodiments of the present invention, which also communicates with the processor 290. The processor 290 can be any commercially available or custom microprocessor.

As illustrated in FIG. 2, the portable electronic device communicates with a base station transceiver 260 connected to a mobile switching center ("MSC") 270 in accordance with some embodiments of the present invention. The transceiver 212 typically includes a transmitter circuit and a receiver circuit, which respectively transmit outgoing radio frequency signals to the base station transceiver 260 and receive incoming radio frequency signals, such as voice and data signals, from the base station transceiver 260 via an antenna 205. The antenna 205 may be an embedded antenna, a retractable antenna or any antenna known to those having skill in the art without departing from the scope of the present invention. The radio frequency signals transmitted between the portable electronic device 240 and the base station transceiver 260 may include both traffic and control signals (e.g., paging signals/messages for incoming calls), which are used to establish and maintain communication with another party or destination. The processor 290 may support various functions of the portable electronic device, including a download control circuit 250 configured to download, install, execute and uninstall applications according to some embodiments of the present invention as will be discussed further herein.

It will be understood that in some embodiments of the present invention, the transceiver 212 may be a short range transceiver. The short range transceiver may be, for example, a Bluetooth transceiver, which may allow for high transfer rates of data over relatively short distances. It will be further understood that portable electronic devices 240 according to some embodiments of the present invention may include a wireless transceiver and a short range transceiver/transmitter.

In some embodiments of the present invention, the base station transceiver 260 comprises the radio transceiver(s) that defines an individual cell in a cellular network and communicates with the portable electronic device 240 and other portable electronic devices in the cell using a radio-link protocol. Although only a single base station transceiver 260 is shown, it will be understood that many base station transceivers may be connected through, for example, a mobile switching center 270 and other devices to define a wireless communications network.

Although the present invention may be embodied in communication devices or systems, such as the portable electronic device 240, the present invention is not limited to such devices and/or systems. Instead, the present invention may be embodied in any apparatus that may be configured to download, install, execute and/or uninstall applications from a server in accordance with embodiments of the present invention.

As further illustrated in FIG. 2, the download control circuit 250 includes an application circuit 251, a location circuit 253, a data manager 255, a content handler 257 and a timer 259. Although these circuits and modules are illustrated in FIG. 2 as separate circuits/modules, it will be understood that any of these circuits/modules can be combined or split into multiple circuits/modules without departing from the scope of the present invention. The functionality of each of the application circuit 251, the location circuit 253, the data manager 255, the content handler 257 and the timer 259 will be discussed further herein.

In particular, the application circuit 251 is configured to activate the other components in order to issue reception, installation and/or removal of the application from the server. The application circuit 251 contains the logic for determining when to check for new applications, when to install and start applications and when to remove them, based on the information provided for each application by the server 110. The location circuit 253 is configured to provide the current position of the portable electronic device 240, for example, coordinates. The location circuit 253 may also be configured to deliver trigger signals to other components when the portable electronic device 240 enters or leaves a defined region 130.

The data manager 255 may be configured to download data from the network and store it locally in the portable electronic device 240 as well as store links (URLs) to data on the network locally in the portable electronic device 240. The data manager 255 may also be configured to delete previously stored data from the portable electronic device 240. The content handler 257 may be configured to instruct specific applications to open data of specific types, for example, opening JPEG files with the image viewer application or opening JAR files with the Java application loader. The timer 258 may be configured to receive timeout requests based on absolute or relative time information from other components and send back timeout signals accordingly.

It will be understood that although each of the circuit and modules of the download control circuit 250 are discussed as being configured for specific tasks, these tasks may be combined into one circuit or module or split into additional circuits or modules without departing from the scope of the present invention.

Exemplary operations of the portable electronic device 140/240 in conjunction with the server 110 will now be discussed with respect to FIGS. 1 and 2. One or more application owners, for example, trade fair organizers or travel agents, register an application 122, 124 and 126 with and store an application 122, 124 and 126 on the server 110 as discussed above. Each application has an associated region 130 and duration, which is also stored on the server 110. The portable electronic device 140/240 includes a download control circuit 250 that is configured to periodically check the position of the portable electronic device 140/240 using an absolute positioning device, for example, a GPS receiver or Cell ID, or a relative positioning device such as discovery of Bluetooth devices and the like. The position data, for example, geographical coordinates, is sent to the system server 110 in addition to a unique device identifier associated with the portable electronic device 140/240. The server 110 then determines if the portable electronic device 140/240 has entered a new region or a new region has been registered where the portable electronic device 140/240 is located. The periodical check of the position of the portable electronic device 140/240 may be quite frequent while the actual transmitting of position data to the server 110 may be less frequent. For example, the portable electronic device 140/240 can determine that a small position change is reported only once during a longer time period, for example, a day or an hour, while a larger position change is reported directly. The user of the portable electronic device 140/240 may also manually issue a position check and report without departing from the scope of the present invention.

When the server 110 determines that a portable electronic device 140/240 has entered a new registered region 130, the server 110 may be configured to check that a unique device identifier associated with the portable electronic device 140/240 is associated with the application for this particular region 130. For example, the server 110 determines if the unique device identifier for this portable electronic device 140/240 is in the set of device identifiers associated with this particular application. If the unique device identifier of the portable electronic device 140/240 is present in the set of identifiers associated with the applications, the communication circuit 115 of the server 110 is configured to transmit a link (URL) to the application data and the duration data for the application for the region 130 to the portable electronic device 140/240.

When the portable electronic device enters a new region 130, the portable electronic device may be configured to automatically download the data from the URL received from the server 110. In some embodiments of the present invention, the content of the URL may be a web page. The web browser 218 of the portable electronic device 140/240 may be started and the web page may be loaded on the display 214. In certain embodiments of the present invention, a bookmark for the web page may be created automatically so as to allow future access to the web page. In further embodiments of the present invention, the content of the URL may be an executable application, for example, a Java Midlet, it may be installed and automatically executed. In some embodiments of the present invention, a uninstall event may be scheduled based on the duration information provide from the server 110.

When the duration of the application elapses, the application is uninstalled and removed from the portable electronic device 140/240. In some embodiments of the present invention, when one application is uninstalled, the portable electronic device 140/240 may be configured to provide a current position to the server 110 to determine if a new application is available for the region 130.

During the scheduled duration of the application, the portable electronic device 140/240 is configured to periodically check its position and determine if it has exited the region 130. If it is determined that the portable electronic device 140/240 has exited the region 130, the application is uninstalled and removed from the portable electronic device 140/240.

In some embodiments of the present invention, the applications 122, 124 and 126 themselves may have unique application identifiers. These unique application identifiers may be used to let the owner of an application make updates to the application during the scheduled duration of the application. The server 110 may be configured to announce the updates to portable electronic devices 140/240 using the application. The announcement can be done, for example, as a push of information to the portable electronic device 140/240 or during an ordinary position update by the portable electronic device 140/240. In some embodiments of the present invention, the downloaded application running on the portable electronic device 140/240 may communicate directly with a server associated with an owner of the application and update itself if needed.

Details in accordance with some embodiments of the present invention will now be discussed with respect to FIGS. 1 and 2. The application circuit 251 may be configured to request application updates from the server 110 periodically based on the a current location of the portable electronic device 140/240. Each update response may include a set of applications that should be updated by the device. It will be understood that the set may be empty.

For each application in an update response, an application package including the following parameters may be present:

1. [UUID] A universal unique identifier (unique application identifier) for the application. The UUID may be used for future reference, for example, to tell the server 110 that the application has been removed or when the server tells the portable electronic device 140/240 to update or remove an application.
2. [MIME] A MIME type identifying the type of data in the application, for example, a Java MIDLET (e.g. application/java-archive), a picture file (e.g. image/jpeg), a sound file (e.g. audio/mp4) and the like. The MIME can also be empty, indicating that the application is a web page, and that it should be handled by the web browser 218 rather than the content handler 257.
3. [URL] A uniform resource locator indicating where the application is available, for example, the Java JAR or JAD files, the web page content and the like.
4. [REGION] The geographical region 130 within which the application should be available for the portable electronic device 140/240.
5. [DURATION] The time period during which the application should be available for the portable electronic device 140/240. For example, the duration may include the start of the time period is PERIOD_START and the end is PERIOD_END.
6. [AUTO] A flag determining if the application should be automatically started after installation.

Reasons for application updates may include, but are not limited to, the REGION of an installed application has been changed by the application owner; the PERIOD of an installed application has been changed by the application owner; the AUTO flag of an installed application has been changed by the application owner; and/or a new application should be installed since its REGION intersects with a current location of the portable electronic device 140/240.

In some embodiments of the present invention, two applications may be two versions of the same application. Thus, for the user's perspective it may appears to be the same application, but from a system perspective they are different. This may be useful for version handling as the server 110 can issue a removal of application1, for example, by setting the PERIOD data to the past, and installation of application2 in the same application update response. In other embodiments of the present invention, application updates may be accomplished by using the same application, but changing the resource locator (URL) as will be discussed further below.

Some embodiments of the present invention may use the algorithms discussed below. When the application circuit 251 (AC) starts, it runs an application update request in zero seconds. This call is then scheduled to run periodically each PREDEFINED_UPDATE_PERIOD second. The update request can also be signaled to run when the location circuit 253 (LC) detects large location variations.

A first algorithm requests an application update request in X seconds. In particular:

1. If X>0 then AC instructs the timer 258 (T) to signal an application update request in X seconds.
2. Else, AC runs an application update request.

A second algorithm requests an application update request. In particular:

1. AC requests coordinate update from LC.
2. AC sends its client identifier and the coordinates of the portable electronic device to the server in an application update request.
3. The server checks the record of already sent application packages for the provided client identifier. If any parameter of an application package has changed since the application was sent the last time, this application package is added to the update response set.
4. The server checks the complete set of application packages for applications that are available for the client identifier and has REGION parameters intersecting with a current position of the portable electronic device, but have not been sent previously. If the present time is during the set DURATION the application package is added to the update response set. If the DURATION is in the near future the server may still decide to add the application package to the set.
5. The application update response is sent back to the device.
6. The AC runs an application update analysis (see below).
7. The AC runs an application update request in PREDEFINED_UPDATE_PERIOD seconds.

During an application update analysis the AC has received a set of application packages and checks the following for each application package in the set:

1. If the UUID of the application package is not present in the application package record of the portable electronic device,
    a. The AC tells LC to check if the portable electronic device is outside the REGION. If so, the AC runs an application removal request (see below).
    b. Else, if the PERIOD_END is in the past, the AC runs an application removal request.
    c. Else, the AC runs an application download scheduling (see below).
2. Else, the application package has previously been received and may have changed. The AC runs an application parameter check (see below).

An application download scheduling includes the following steps:

1. AC tells T to remove any timers related to the LBA.
2. AC tells LC to remove any triggers related to the application.
3. AC checks if the application is running. If it is, it is stopped.
4. AC checks if the application is installed. If it is, it is un-installed and the associated stored content file is deleted.
5. AC tells T to signal an application download (see below) at the time of PERIOD_START.
6. AC tells LC to signal an application removal (see below) if the portable electronic device leaves the REGION.

An application download includes the following steps:

1. AC tells T to remove any timers related to the application.
2. AC tells LC to remove any triggers related to the application.
3. AC checks if the application is running. If it is, it is stopped.

4. AC checks if the application is installed. If it is, it is un-installed and the associated stored content file is deleted.
5. If the MIME of the application package is empty the data manager 255 (DM) is told to store the URL as a link file associated with the UUID of this application.
6. Else, if the MIME of the application is nonempty the DM is told to download the content of the URL to a file associated with the UUID of this application.
7. When the download/store is done the AC runs an application removal scheduling (see below).
8. After that, the AC checks the AUTO flag. If it is true the AC runs an application startup (see below).

Application removal scheduling includes the following steps:
1. AC tells T to remove any timers related to the application.
2. AC tells LC to remove any triggers related to the application.
3. AC tells T to signal an application removal (see below) at the time of PERIOD_END.
4. AC tells LC to signal an application removal if the portable electronic device leaves the REGION.

An application removal includes the following steps:
1. AC tells T to remove any timers related to the application.
2. AC tells LC to remove any triggers related to the application.
3. AC checks if the application is running. If it is, it is stopped.
4. AC checks if the application is installed. If it is, it is un-installed; the associated stored content file is deleted and AC runs an application removal request (see below).

During an application removal request the AC needs to tell the server that is has removed an application. In particular:
1. AC sends its client identifier and the UUID of the removed application in an application removal request to the server.
2. The server removes the application from the record of sent application of the client.

During an application startup the AC checks if the application is installed and not running. If so, AC tells CH to open the stored associated file using the application associated with the MIME of the application.

During an application parameter check, the AC has receives an updated application package which corresponds to an application package which is already present in the portable electronic device. The parameters are checked like below, depending on if the application content is already downloaded and installed or in queue for download. In particular, if the application package is in the download queue:
1. If the portable electronic device is outside the updated REGION or if the updated PERIOD_END is in the past, run an application removal.
2. Else set the stored parameters to the updated versions and run an application download scheduling.

If, on the other hand, application is installed:
1. If the portable electronic device is outside the updated REGION or if the updated PERIOD_END is in the past, run an application removal.
2. Else if the MIME or URL has changed or the updated PERIOD_START is in the future, set the stored parameters to the updated versions and run an application download scheduling.
3. Else if the REGION or PERIOD has changed, set the stored parameters to the updated versions and run an application removal scheduling.
4. Else if the AUTO has changed from false to true, set the stored parameters to the updated versions and run an application startup.
5. Else set the stored parameters to the updated versions.

Although various functionalities of the server 110 and portable electronic device 140/240 has been shown in FIGS. 1 and 2 within separate blocks, it is to be understood that two or more of these functions may be combined in a single physical integrated circuit package and/or the functionality described for one or the blocks may be spread across two or more integrated circuit packages without departing from the scope of the present invention.

Figure 3:
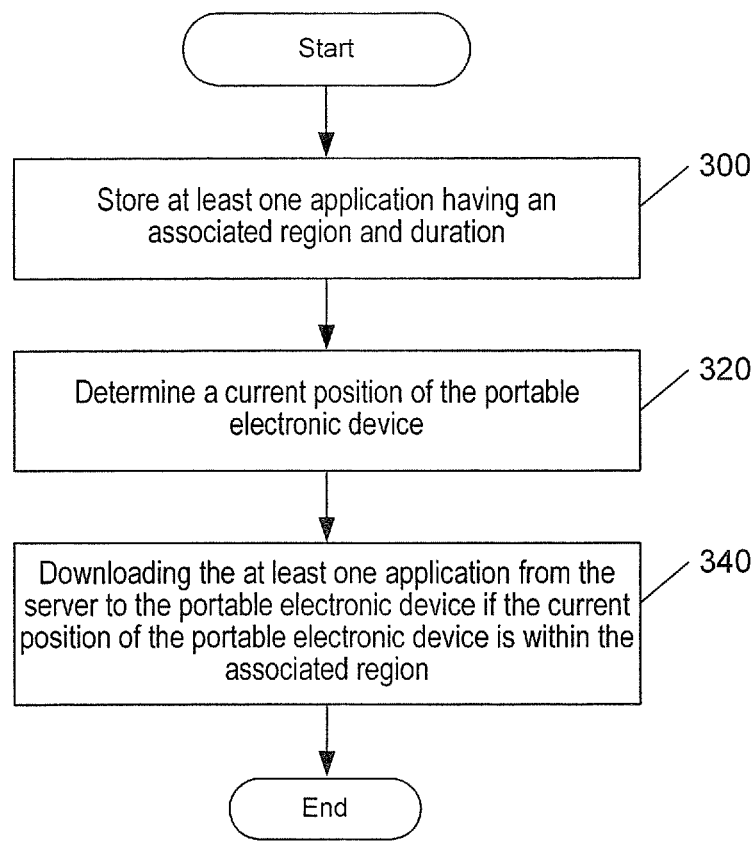
FIGS. 3 and 4 are flowcharts illustrating methods according to various embodiments of the present invention.
Figure 4:
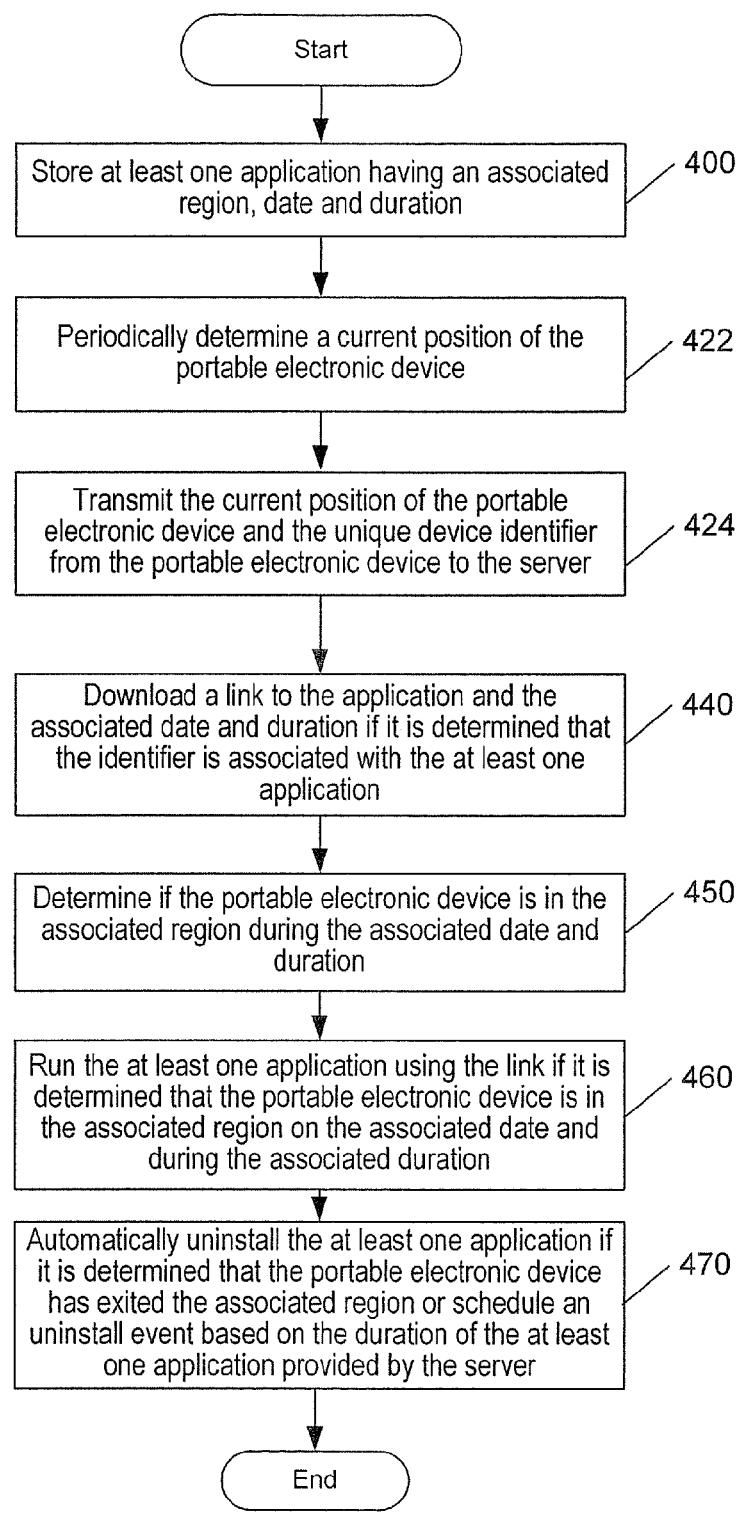

Referring now to FIGS. 3 and 4, methods for downloading applications in accordance with various embodiments of the present invention will be discussed. Referring first to FIG. 3, methods for downloading applications to a portable electronic device from a server based on a geographical location of the portable electronic device will be discussed. As illustrated therein, operations begin at block 300 by storing at least one application at the server. The at least one application has an associated region and duration. A current position of the portable electronic device is determined (block 320). At least one of the at least one stored applications is downloaded from the server to the portable electronic device if the current position of the portable electronic device is within the associated region (block 340).

Referring now to FIG. 4, operations begin at block 400 by storing at least one application at the server. The at least one application has an associated region and duration. The portable electronic device may be associated with a unique device identifier. A current position of the portable electronic device may be periodically determined at the portable electronic device (block 422). The current position of the portable electronic device and the unique device identifier may be transmitted from the portable electronic device to the server (block 424).

A link to the at least one application and the associated duration of the at least one application may be downloaded from the server if it is determined that the unique device identifier of the portable electronic device is associated with the at least one application (block 440).

It may be determined if the portable electronic device is in the associated region during the associated duration (block 450). The at least one application may be executed using the link if it is determined that the portable electronic device is in the associated region during the associated duration (block 460). In some embodiments of the present invention, the at least one application may be automatically uninstalled if it is determined that the portable electronic device has exited the associated region (block 470). Furthermore, in some embodiments of the present invention, an uninstall event may be scheduled for the at least one application based on the associated duration of the at least one application provided by the server (block 470).

In some embodiments of the present invention, once the application is uninstalled (block 470), the current position of the portable electronic device may be determined responsive to the automatic uninstall and the current position of the portable electronic device may be provided to the server so as to allow the portable electronic device to determine if at least one additional application is available to be downloaded to the portable electronic device based on the current position of the portable electronic device and the current date.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A portable electronic device configured to communicate with and download applications from a server configured to store at least one application based on a geographical location of the portable electronic device, the application having an associated region and duration of the application, the portable electronic device comprising:
   a location circuit configured to determine a current position of the portable electronic device and provide the current position of the portable electronic device to the server;
   a data manager configured to receive a link to the at least one application from the server responsive to the provided current position information and download the at least one stored application using the received link if the current position of the portable electronic device is within the associated region, wherein the at least one application is provided on a web page; and
   a content handler configured to open a web browser on the portable electronic device and load the web page on the web browser,
   wherein the duration of the application defines a time period during which the application is valid and allowed to run;
   wherein the portable electronic device is on a list of portable electronic devices associated with the application, the list of portable electronic devices being less than all portable electronic devices present in the region;
   wherein the portable electronic device is associated with a unique device identifier;
   wherein the list of portable electronic devices includes the associated unique device identifiers for each of the portable electronic devices; and
   wherein the location circuit is further configured to periodically determine a current position of the portable electronic device and transmit the current position of the portable electronic device and the unique device identifier to the server.

2. The portable electronic device of claim 1, wherein the data manager is further configured to:
   transmit the current position of the portable electronic device and the unique device identifier to the server; and
   receive the link to the at least one application and the associated duration of the at least one application from the server if it is determined that the unique device identifier of the portable electronic device is associated with the at least one application.

3. The portable electronic device of claim 2, wherein the data manager is further configured to:
   determine if the portable electronic device is in the associated region during the associated duration; and
   run the at least one downloaded application if it is determined that the portable electronic device is in the associated region during the associated duration.

4. The portable electronic device of claim 1, wherein the data manager is further configured to automatically create a bookmark for the web page.

5. The portable electronic device of claim 1, wherein the data manager is further configured to automatically uninstall the at least one application if it is determined that the portable electronic device has exited the associated region.

6. The portable electronic device of claim 3, further comprising an application circuit configured to schedule an uninstall event for the at least one application based on the associated duration of the at least one application provided by the server.

7. The portable electronic device of claim 6:
   wherein the application circuit is further configured to determine if the associated duration of the at least one application has elapsed based on the scheduled uninstall event; and
   wherein the data manager is further configured to automatically uninstall the at least one application if it is determined that the duration of the at least one application has elapsed.

8. The portable electronic device of claim 7:
   wherein the location circuit is further configured to automatically determine the current position of the portable electronic device responsive to the automatic uninstall and provide the current position to the server so as to allow the portable electronic device to determine if at least one additional application is available to be downloaded to the portable electronic device based on the current position of the portable electronic device and the current date.

9. A server configured to download applications to a portable electronic device based on a geographical location of the portable electronic device, comprising:
   a storage circuit configured to store at least one application, the at least one application having an associated region and duration; and
   a communications circuit configured to receive current position information associated with the portable electronic device from a location circuit located in the portable electronic device and download a link to at least one of the at least one stored applications to the portable electronic device if the current position of the portable electronic device is within the associated region, wherein the at least one stored application is provided on a web page configured to open on a web browser of the portable electronic device,
   wherein the stored application has an associated duration of the application and wherein the duration of the application defines a time period during which the application is valid and allowed to run;
   wherein the portable electronic device is on a list of portable electronic devices associated with the application, the list of portable electronic devices being less than all portable electronic devices present in the region;
   wherein the portable electronic device is associated with a unique device identifier;
   wherein the list of portable electronic devices includes the associated unique device identifiers for each of the portable electronic devices; and
   wherein the location circuit is further configured to periodically determine a current position of the portable electronic device and transmit the current position of the portable electronic device and the unique device identifier to the server.

10. The server of claim 9, wherein the communications circuit is further configured to:
    receive the current position of the portable electronic device and the unique device identifier from the portable electronic device;
    determine if the unique device identifier of the portable electronic device is associated with the at least one application; and
    download the link to the at least one application and the associated duration of the at least one application to the portable electronic device if it is determined that the unique device identifier of the portable electronic device is associated with the at least one application.

11. The server of claim 9, wherein the at least one application has an associated unique application identifier and wherein the communications circuit is further configured to:
receive updates for the at least one application during the associated duration of the at least one application, the updates being associated with the unique application identifier; and
announce the received updates to users of the at least one application having the unique application identifier.

12. The server of claim 9, wherein the communications circuit is further configured to receive, from an owner of the at least one application:
region data defining the associated region for the at least one application;
duration data defining the associated duration for the at least one application;
a link to the at least one application or the at least one application; and
at least one client identifier that identifies users allowed to access the at least one application.

13. A method for downloading applications to a portable electronic device from a server based on a geographical location of the portable electronic device, comprising:
storing at least one application at the server, the at least one application having an associated region and duration of the application;
determining a current position of the portable electronic device based on information from a location circuit in the portable electronic device;
downloading at least one of the at least one stored applications from the server to the portable electronic device if the current position of the portable electronic device is within the associated region, wherein the at least one stored application is provided on a web page configured to open on a web browser of the portable electronic device,
wherein the duration of the application defines a time period during which the application is valid and allowed to run;
wherein the portable electronic device is on a list of portable electronic devices associated with the application, the list of portable electronic devices being less than all portable electronic devices present in the region;
wherein the portable electronic device is associated with a unique device identifier; and
wherein the list of portable electronic devices includes the associated unique device identifiers for each of the portable electronic devices;
periodically determining a current position of the portable electronic device at the portable electronic device; and
transmitting the current position of the portable electronic device and the unique device identifier from the portable electronic device to the server.

14. The method of claim 13, further comprising:
downloading a link to the at least one application and the associated duration of the at least one application from the server if it is determined that the unique device identifier of the portable electronic device is associated with the at least one application.

15. The method of claim 14, further comprising:
determining if the portable electronic device is in the associated region during the associated duration; and
running the at least one application using the link if it is determined that the portable electronic device is in the associated region during the associated duration; and
automatically uninstalling the at least one application if it is determined that the portable electronic device has exited the associated region.

16. The method of claim 14, further comprising scheduling an uninstall event for the at least one application based on the associated duration of the at least one application provided by the server.

17. The method of claim 16, further comprising:
determining if the associated duration of the at least one application has elapsed based on the scheduled uninstall event;
automatically uninstalling the at least one application if it is determined that the duration of the at least one application has elapsed;
automatically determining the current position of the portable electronic device responsive to the automatic uninstall; and
providing the current position of the portable electronic device to the server so as to allow the portable electronic device to determine if at least one additional application is available to be downloaded to the portable electronic device based on the current position of the portable electronic device and the current date.

* * * * *

UNITED STATES PATENT AND TRADEMARK OFFICE
CERTIFICATE OF CORRECTION

PATENT NO. : 9,225,823 B2
APPLICATION NO. : 11/848453
DATED : December 29, 2015
INVENTOR(S) : Andreasson et al.

Page 1 of 1

It is certified that error appears in the above-identified patent and that said Letters Patent is hereby corrected as shown below:

In the Claims:
Column 15, Claim 5, Line 62: Please correct "device of claim 1,"
 to read -- device of claim 4, --

Signed and Sealed this
Nineteenth Day of July, 2016

Michelle K. Lee
*Director of the United States Patent and Trademark Office*